Figure 3:
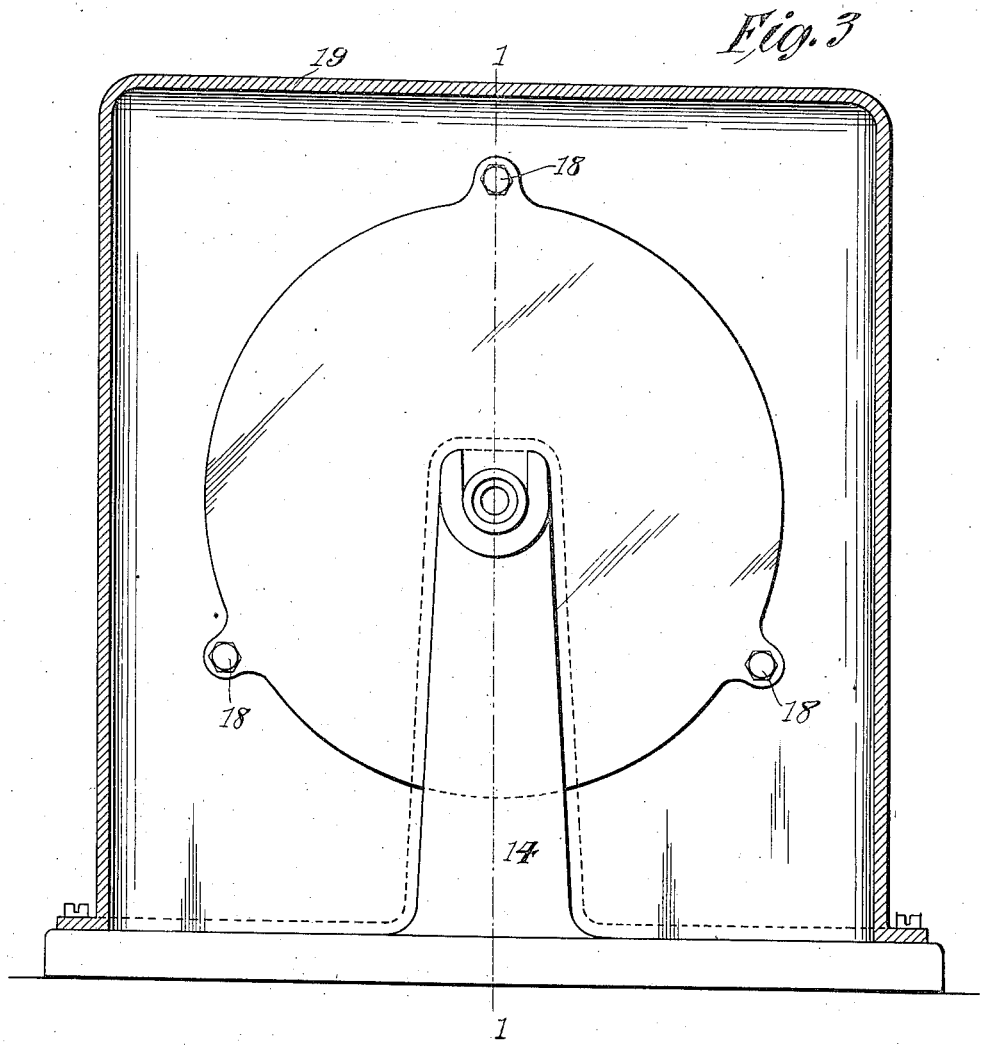

J. W. AYLSWORTH.
PROCESS FOR MOLDING DISK SHAPED ARTICLES.
APPLICATION FILED SEPT. 15, 1910.
1,146,389.
Patented July 13, 1915.
2 SHEETS—SHEET 1.
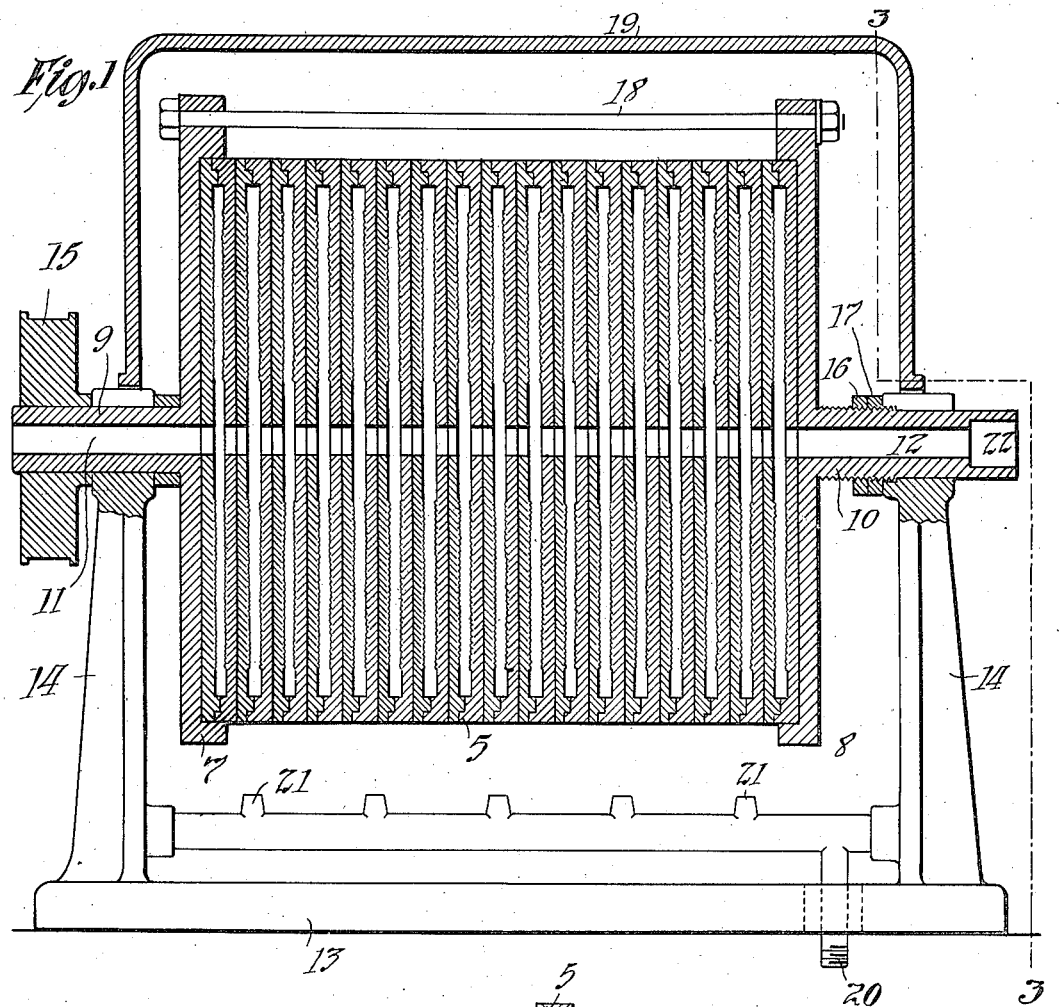
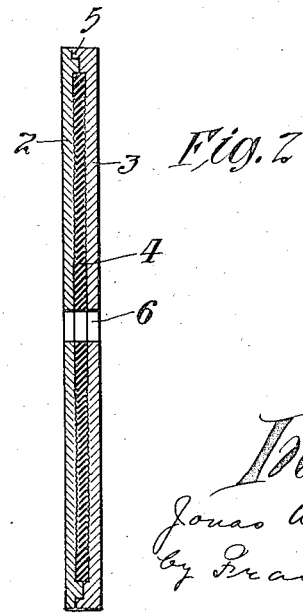
Witnesses:
Frank D. Lewis
Dyer Smith
Inventor
Jonas W. Aylsworth
by Frank L. Dyer
his Atty J. W. AYLSWORTH.
PROCESS FOR MOLDING DISK SHAPED ARTICLES.
APPLICATION FILED SEPT. 15, 1910.

1,146,389.

Patented July 13, 1915.
2 SHEETS—SHEET 2.

Witnesses:
Frank L. Dyer
Dyer Smith

Inventor:
Jonas W. Aylsworth
by Frank L. Dyer
his Atty.

UNITED STATES PATENT OFFICE.

JONAS W. AYLSWORTH, OF EAST ORANGE, NEW JERSEY, ASSIGNOR, BY MESNE ASSIGNMENTS, TO CONDENSITE COMPANY OF AMERICA, OF BLOOMFIELD, NEW JERSEY, A CORPORATION OF NEW JERSEY.

PROCESS FOR MOLDING DISK-SHAPED ARTICLES.

1,146,389.

Specification of Letters Patent.

Patented July 13, 1915.

Application filed September 15, 1910. Serial No. 582,122.

*To all whom it may concern:*

Be it known that I, JONAS W. AYLSWORTH, a citizen of the United States, and a resident of East Orange, in the county of Essex and State of New Jersey, have invented a certain new and useful Process for Molding Disk-Shaped Articles, of which the following is a description.

My invention relates to a process of molding disk shaped articles such as sound records.

The process in its preferred form is carried out by forcing molten or fluid record material axially into a closed disk record mold or a series of such molds, the mold or molds then being rotated about their axis. By the centrifugal motion developed, the record material is spread over the record surface or surfaces of the molds, air being forced to the center of rotation and expelled, together with any surplus material, through an opening in the axis of rotation. Heat is applied to the periphery of the rotating molds whereby the record material is hardened in contact with the record matrix or matrices during the rotation, either by causing a chemical reaction and transformation, or other hardening process.

The objects of my invention are the production of an improved process of the character above outlined.

In order that a clearer understanding of my invention may be had, attention is hereby directed to the accompanying drawings forming part of this specification and illustrating one form of apparatus in which my invention may be practised.

In the drawings, Figure 1 represents a central vertical cross section through a series of molds mounted to be rotated and heat applied to the same in a suitable apparatus, the section being taken upon line 1—1 of Fig. 3. Fig. 2 is a cross section through one of the molds with the record inclosed therein. Fig. 3 is an end elevation of the apparatus, partly in section, taken upon line 3—3 of Fig. 1.

My invention especially contemplates the formation of cast disk sound records formed of a phenolic condensation product of the character described in my applications Serial No. 496,060, filed May 14, 1909, Plastic composition and process of manufacturing the same, and Serial No. 543,238, filed February 11, 1910, entitled Phenolic condensation product and method of preparing the same. Or, the materials injected or placed within the molds and subsequently hardened to form the records may be of any suitable character which react upon application of sufficient heat to form final infusible hard phenolic condensation products, such as described by the applicant and other inventors. Or the record material may be of any suitable character, such that it may be placed in the record molds in fluid condition and hardened therein during rotation of the molds by application of sufficient heat.

The disk record molds each composed of two members 2 and 3 which may be fitted together as shown, inclose a central space in which the sound record 4 shown in Fig. 2 may be formed. The inner faces of members 2 and 3 are both provided with record mold surfaces, or negative sound records, if it is desired to form double records or sound records having record impressions on both sides, or the record surface may be provided on only one of the surfaces mentioned, if it is desired to produce singlefaced records. The mold members 2 and 3 are made interlocking as by the provision of peripheral annular tongues 5 formed in one of the members and fitting within a corresponding annular recess in the other member. The molds are provided with axial openings 6 therethrough.

The molds are assembled by mounting the same side by side, as shown in Fig. 1, upon a rod which passes through the axial openings 6 of the molds. The end plates 7 and 8 are then adjusted to clamp and hold together the molds 1 when the rod referred to may be removed. The end plates 7 and 8 are provided with short axial studs 9 and 10 preferably formed integral therewith, by which the end plates and molds clamped thereby may be rotatably supported. Shafts 9 and 10 are formed with central passageways 11 and 12 therethrough, which passageways are in alinement with the passageways 6 through the centers of the different molds and which communicate with the spaces between the matrix surfaces in the molds.

A suitable frame 13 is provided from which rise standards 14 in which hollow shafts 9 and 10 are rotatably mounted. As shown in the drawings, a belt wheel 15 is secured to the hollow shaft 9, so that power for rotating end plates 7 and 8 and the inclosed molds may be transmitted to shaft 9, or the molds may be rotated in any other desired manner. The molds may be clamped and held secure in any desired way. As shown in the drawings, the hollow shaft 10 is provided with a screw thread upon the periphery thereof upon which are mounted nuts 16 and 17, which may be tightened in contact with the surface of the bearing for shaft 10 in upright 14 for clamping together the end plates and inclosed molds. Also, if desired, bolts 18 may be passed through the end plates 7 and 8 beyond the periphery of molds 1, the nuts upon the bolts being screwed tightly to cause a uniform clamping of the molds. The whole rotatable structure may be mounted within an oven 19 or protecting covering to prevent excessive loss of heat. Heat to cause the chemical reaction and transformation of the record material into the hardened record during the rotation of the molds may be provided in any suitable manner, as by the pipe 20, which may be a steam or hot fluid pipe or may supply gas or other inflammable material to the burners 21, as shown.

The liquid material is passed into the interior of the molds, as shown in the drawings, through the central passageway 12 in shaft 10, which may be provided with a suitable stuffing box 22, the material coming from any suitable source of supply. If desired, the material may be forced under pressure through passage 12 into the molds. As the molds rotate, the material fills the interior of the molds, the air being displaced by the record material and forced together with any surplus material out through axial opening 11 in shaft 9. The heating provided by burners 21 progresses from the outside toward the center of the records being formed and hardens the outside diameter of the records first. Since the hardening progresses toward the center of the records, such contraction or shrinkage as may take place during the hardening operation is compensated for by the still liquid portion of the mass at the center of the records. This method of hardening makes a product practically free from stresses due to condensation reactions, in the case in which phenolic condensation products are formed. After the records are formed, the central holes in the disks may be drilled to the size of the matrix hole 6 after cooling, or the holes may be punched through the records while hot.

In the case of condensation products, the ingredients, phenol and formaldehyde or other equivalents, may be forced into the molds in fluid condition, or partial reaction products of the same in liquid condition may be used, the materials being injected under sufficient pressure to counteract the evolution of dissociation gases during the reaction. Or a fusible phenolic condensation product of the character described by me in my applications above referred to and termed "phenol resin" may be used in fused or fluid condition together with a sufficient percentage of hexa-methylene-tetra-amin, tri-oxy-methylene, or other hardening agent containing the methylene radical $CH_2$, the reaction taking place in this instance without the necessity for applying compensating pressure. If desired, a reinforcing web or substance may be placed within the molds and the record material cast about the same, or a peripheral ring of metal or other substance may be placed within the matrix to form an outer incasing ring in the record when finished. The record material may contain mono-nitronaphthalene or other plasticity agent, as described in my applications referred to, and may have inert filling materials incorporated with the same, if desired.

While I have described the preferred embodiment of my invention, I desire it to be understood that I am not limited to the exact details specified.

Having now described my invention, what I claim and desire to secure by Letters Patent is as follows:—

1. The process of molding disk sound records, consisting in rapidly rotating about its axis a closed disk record mold containing fluid record material, applying heat to the material to harden the same by chemical action during rotation with one plane surface thereof in intimate contact with the mold surface to take the record impression thereon, opening the mold and removing the disk record so formed, substantially as described.

2. The process of molding disk sound records, consisting in rapidly rotating about its axis a disk record mold closed except for an opening therein at the axis thereof, introducing fluid record material into the said mold through the said opening, applying heat to the material to harden the same by chemical action during rotation with one plane surface thereof in intimate contact with the mold surface to take the record impression thereon, opening the mold and removing the disk record so formed, substantially as described.

3. The process of molding disk sound records, consisting in rapidly rotating about its axis a closed disk record mold containing ingredients which react chemically on application of sufficient heat to form a hard phenolic condensation product, applying heat to the material to harden the same during rotation with one plane surface thereof in intimate contact with the mold surface to take the record impression thereon, opening the mold and removing the disk record so formed, substantially as described.

4. The process of molding disk sound records, consisting in introducing fluid record material axially into a plurality of axially alined disk record molds, rapidly rotating the molds about their common axis, applying heat to the material to harden the same by chemical action, and removing the disk records thus formed from the molds, substantially as described.

5. The process of molding sound records, which consists in rotating about its axis a closed disk record mold containing fluid record material, and applying heat to the periphery of the disk mold to harden the record material by chemical action in contact with the mold in such manner that the hardening proceeds from the periphery of the molded record toward the center, substantially as described.

6. The process of molding disk shaped articles, consisting in rapidly rotating about its axis, a disk mold containing fluid material, causing the said material to harden by chemical action during the rotation of the mold, and removing the article so formed from the mold, substantially as described.

7. The process of molding disk shaped articles, consisting in introducing fluid material axially into a plurality of axially alined molds, rapidly rotating the molds about their common axis, causing the material to harden by chemical action, and removing the articles so formed from the molds, substantially as described.

8. The process of molding disk shaped articles, consisting in rapidly rotating about its axis a disk mold containing fluid material and a reinforcing member, causing the material to harden by chemical action with the reinforcing member secured thereto during the rotation of the mold, and removing the article so formed from the mold, substantially as described.

9. The process of molding disk sound records, consisting in rapidly rotating about its axis a disk record mold containing fluid record material and having at an angle to its axis a record mold surface, applying heat to the record material to cause the same to harden by chemical action during the rotation of the mold, and removing the disk record so formed from the mold, substantially as described.

10. The process of molding disks, consisting in rapidly rotating about its axis a disk mold containing ingredients which react chemically on application of sufficient heat to form a hard phenolic condensation product, applying heat to the material to harden the same during rotation, and removing the disk so formed from the mold, substantially as described.

This specification signed and witnessed this 12th day of September, 1910.

JONAS W. AYLSWORTH.

Witnesses:
 DYER SMITH,
 ANNA R. KLEHM.